Oct. 16, 1951 H. G. McGRATH ET AL 2,571,151
SEPARATION OF ORGANIC COMPOUNDS
Filed Nov. 14, 1946 2 Sheets-Sheet 2

INVENTORS
HENRY G. McGRATH
HERBERT J. PASSINO
LOUIS C. RUBIN
BY C. F. Liebrecht
ATTORNEY Patented Oct. 16, 1951

2,571,151

UNITED STATES PATENT OFFICE 2,571,151

SEPARATION OF ORGANIC COMPOUNDS

Henry G. McGrath, Elizabeth, Herbert J. Passino, Englewood, and Louis C. Rubin, West Caldwell, N. J., assignors to The M. W. Kellogg Company, Jersey City, N. J., a corporation of Delaware Application November 14, 1946, Serial No. 709,872

18 Claims. (Cl. 260—450)

This invention relates to the separation of organic compounds and relates more particularly to the separation of oxygenated organic compounds from the reaction product obtained in the reduction of carbon monoxide with hydrogen in the presence of a catalyst. Still more particularly, this invention is directed to an improved process for the separation and recovery of useful oxygenated organic compounds present in the reactor gas obtained from the hydrogenation of carbon monoxide in the presence of a reducible metal catalyst. These products may include light and heavy alcohols and organic acids, esters, aldehydes, ketones and hydrocarbons.

It is an object of this invention to provide an improved method for the separation of oxygenated organic compounds present in the reactor gases obtained in the catalytic hydrogenation of carbon monoxide in order to effect efficient and economical recovery of relatively high yields of such compounds. Other objects and advantages will be apparent from the following more detailed disclosure.

The accompanying drawing illustrates diagrammatically one form of the apparatus employed and capable of carrying out the process of our invention. The invention will be described in detail by reference to a process employing the apparatus illustrated in the drawing, but it should be noted that it is not intended that the invention be limited to the embodiment as illustrated but is capable of their embodiments which may extend beyond the scope of the apparatus illustrated in the drawing. Furthermore, the distribution and circulation of the liquids and vapors is illustrated in the drawing by diagrammatic representation of the apparatus employed. The valves, pumps, compressors and other mechanical elements necessary to effect the transfer of liquids and vapors and to maintain the conditions of temperature and pressure necessary to carry out the function of the apparatus are omitted, in order to simplify the description. It will be understood, however, that much equipment of this nature is necessary and will be supplied by those skilled in the art.

Figure 1:
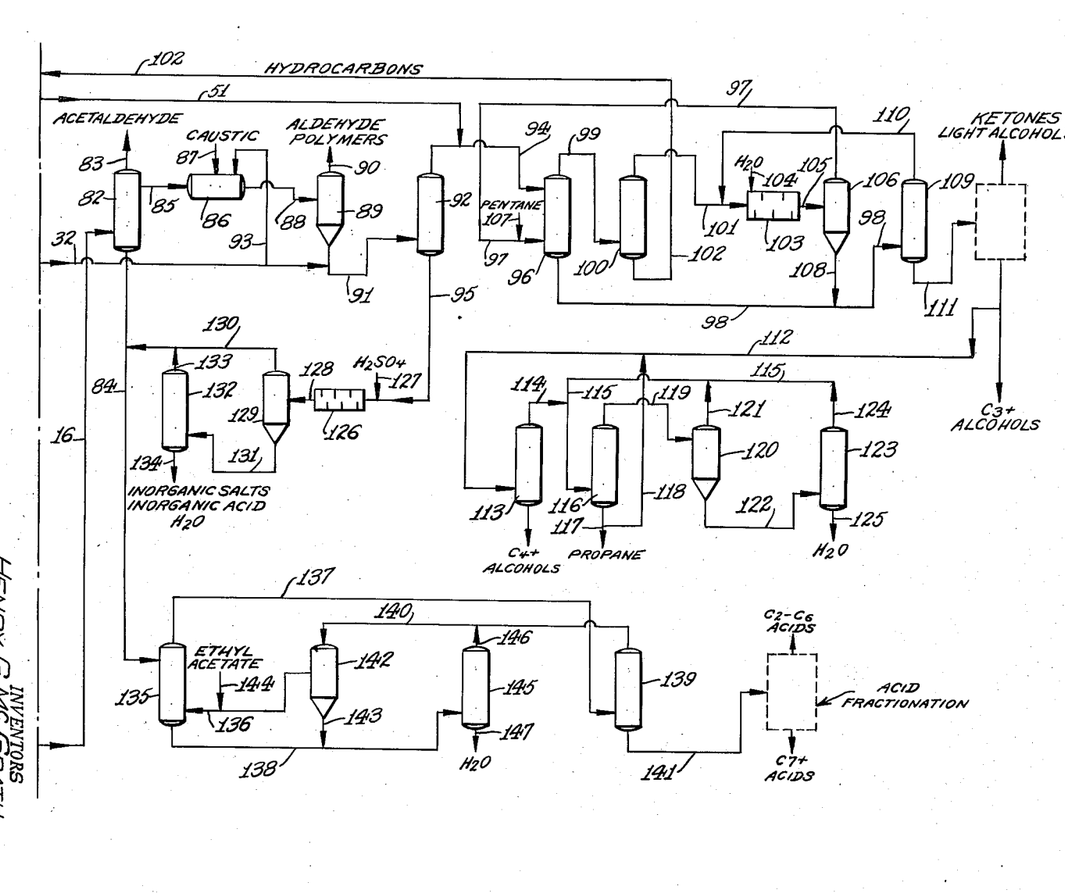

Referring to the drawing, the product of the reaction of carbon monoxide and hydrogen is supplied through line 11. This product is in vapor form substantially as it comes from the reactor at temperatures varying between approximately 300° F. to 700° F. and is first cooled to condense substantially all normally liquid components. Conveniently, condensation may be effected in a plurality of cooling stages which are represented diagrammatically in the drawing by cooler 12 with which line 11 connects. From cooler 12, the mixture of condensate and uncondensed gas passes through line 13 to a separator 14. In the latter the gases are withdrawn through line 15 and the condensate separates as a lower aqueous phase and an upper oil phase. The aqueous phase is drawn off from the bottom of separator 14 through line 16 and the oil phase is drawn off at an intermediate point through line 17. It should be noted that apparatus embodying more than one separation stage may be employed if desired, for example, primary and secondary separation stages may be introduced operating successively and respectively at temperatures of about 150° F. and 100° F.

The gases separated in separator 14 are passed through line 15 to a low point in a suitable scrubbing vessel 18. In this gas scrubber the gases are intimately contacted with water or with an aqueous solution containing oxygenated organic compounds introduced through line 19, in order to absorb the more volatile oxygenated compounds in the water. The remaining gas, essentially free of oxygenated compounds and consisting essentially of light hydrocarbons, is withdrawn overhead through line 20 for further treatment or use outside the scope of the present process.

The oil phase separated in separator 14 is transferred through line 17 to a low point in an oil scrubber 21, in which the oil is contacted intimately with water to absorb in the water the oxygenated compounds which are dissolved in the oil and are relatively more soluble in water, such as low boiling alcohols, ketones and aldehydes. The water employed for this purpose conveniently may be the water employed for scrubbing in gas scrubber 18, which is transferred from scrubber 18 to the upper part of oil scrubber 21 through line 22. The scrubbing water, containing dissolved oxygenated compounds, is withdrawn from the bottom of oil scrubber 21 through line 23, which conveniently connects with line 16 for combining the scrubbing water with the water phase withdrawn from separator 14.

The scrubbed oil is withdrawn from the upper part of scrubber 21 through line 24. Preferably this oil is next treated with alkali to convert organic acids contained in the oil to their corresponding salts, to polymerize aldehydes and to saponify esters. For this purpose the oil is transferred through line 24 to a caustic treater 25 in which it is intimately mixed with alkali in a suitable amount introduced through line 26. After the components of the mixture are maintained in intimate contact for a time sufficient to effect the desired reactions, the mixture is withdrawn from treater 25 through line 27. To facilitate separation of excess alkali and the various reaction products from the oil, the mixture passing through line 27 is contacted with water introduced into line 27 through line 28. The amount of water is limited to the minimum necessary to effect separation of the oil from alkali and other reaction products and also to dissolve alcohols, including butanol and lighter alcohols. Line 27 connects with a mixer 29 which is provided to intimately mix a relatively small amount of water with the oil. The resulting mixture then passes through line 30 to a settler 31, from the bottom of which the aqueous phase is withdrawn through line 32. This aqueous phase contains water, unreacted alkali, salts of heavy organic acids, saponified esters, low boiling alcohols and aldehyde polymers. This mixture is transferred through line 32 for further treatment to be hereinafter described.

The oil which separates in settler 31 as an upper liquid phase is transferred from settler 31 through line 33 to fractionation tower 34. Tower 34 is provided, and suitably equipped, to separate the oil into four relatively narrow boiling fractions. The lightest fraction containing constituents boiling up to 200° F. and containing no alcohols boiling above butanol, is withdrawn overhead through line 35. This fraction is relatively free of oxygenated compounds and is in condition for further use or treatment outside the scope of this process. The highest boiling fraction is withdrawn through line 36 as a bottom condensate. This fraction preferably contains constituents higher boiling than about 430° F. This fraction contains high-boiling hydrocarbon oils and aldehydes and is withdrawn through line 36 for further treatment as desired. Such treatment may include subsequent extraction of oxygenated organic compounds with a suitable solvent, such as a light alcohol. A relatively heavy intermediate fraction boiling between about 310° F. and about 430° F. is withdrawn from tower 34 as a sidestream through line 37. This fraction contains, in addition to hydrocarbons, alcohols containing 7 or more carbon atoms per molecule and is transferred through line 37 for further treatment in the process to be hereinafter described.

A light intermediate fraction boiling between about 200° F. and 310° F. is withdrawn as a sidestream through line 38. This fraction contains in addition to hydrocarbons, alcohols containing 5 or 6 carbon atoms per molecule and is transferred through line 38 to a low point in an extraction tower 39. In tower 39 the fraction introduced through line 38 is subjected to intimate countercurrent contact with a light alcohol or with an aqueous solution of a light alcohol as a treating agent, such as methanol, ethanol or propanol, which is introduced into tower 39 at an upper point through line 40. The treating agent and the oil are contacted in tower 39 under conditions effective to absorb in the treating agent a large proportion of the oxygenated compounds contained in the oil stream passing through line 38. The extract thus produced is withdrawn from the bottom of tower 39 through line 41. The oil treated in tower 39 passes overhead through line 42. This oil absorbs, in tower 39, a small amount of the methanol or other light alcohol treating agent and is next contacted with water to remove such alcohol. Water is mixed with the oil through line 43 which connects with line 42 and the resulting mixture is transferred to settler 44, in which the oil separates as an upper phase and is withdrawn through line 45 for further suitable treatment, outside the scope of this process. It should be noted that fractionation of the treated oil in tower 34 is not necessarily restricted to the boiling ranges indicated. Fractionation at other suitable boiling ranges may be employed. The selection of a boiling range for each fraction will depend upon the relative distribution of the oxygenated compounds and hydrocarbons present.

The extract from the bottom of tower 39 is transferred through line 41 to a distillation tower 46. In tower 46 the extract is heated to distill overhead the light alcohol treating agent to recover it for further use. This results also in the passage overhead of some of the hydrocarbon constituents of the extract which form azeotropes with the treating agent. To recover such hydrocarbons from the distillate, the overhead product of tower 46 is contacted with water to form an aqueous alcohol phase and a hydrocarbon phase. Conveniently this is accomplished by combining the overhead in tower 46 with the raffinate from tower 39. The overhead from tower 46 passes through line 47, which connects with line 42, and the amount of water introduced through line 43 is regulated to supply the amount of water desired in the aqueous treating agent supplied in tower 39 through line 40. This aqueous treating agent is separated in settler 44 as a lower phase and is withdrawn at a low point through line 40. Make-up treating agent is supplied through line 40.

The distillation of the treating agent from the extract from tower 46 forms a residue consisting of two immiscible liquid phases. These are transferred conveniently through line 49 to a settler 50 in which the upper or oil phase containing alcohols having 5 or 6 carbon atoms per molecule, and small quantities of hydrocarbons, is withdrawn for further treatment in accordance with this process through line 51. The lower or aqueous phase, containing light alcohols is withdrawn from the bottom of settler 50 through line 28 and is thus employed as the water treating agent in mixer 29 as described above. The light alcohols contained in the lower phase separated in the settler 50 are thus returned to the system for further recovery and reuse.

The relatively heavy intermediate fraction boiling between about 310° F. and about 430° F., containing in addition to hydrocarbons, alcohols containing 7 or more carbon atoms per molecule is withdrawn from tower 34 as a sidestream and transferred through line 37 to a low point in an extraction tower 52. In tower 52 the fraction introduced through line 37 is subjected to intimate countercurrent contact with a selective polar solvent, such as ethylene glycol, as a treating agent which is introduced into tower 52 at an upper point through line 53. The treating agent and oil are contacted in tower 52 under conditions effective to absorb in the treating agent a large proportion of the oxygenated compounds contained in the oil stream passing through line 37. The extract thus produced is withdrawn from the bottom of tower 52 through line 54. The oil treated in tower 52 absorbs a small amount of the ethylene glycol or other selective polar solvent treating agent, and is passed overhead through line 55 for further treatment in the process hereinafter described.

The extract from the bottom of tower 52 comprising a mixture of the glycol solvent treating agent, alcohols and hydrocarbons is transferred through line 54 to a distillation tower 56. In tower 56 the extract is heated to distill overhead hydrocarbons present as their glycol azeotropes which are withdrawn through line 57 and passed to a separator 58. In the latter hydrocarbons present in the upper phase are withdrawn overhead and passed through line 59 to connect with line 55 containing small amounts of the glycol solvent for further treatment in the process to be hereinafter described. The lower phase in separator 58 comprising the glycol treating agent, is passed through line 53 into tower 52. Makeup treating agent is supplied through line 60.

We have found that the use of a selective polar solvent of the glycol type in the present process, in addition to its desirability as a single selective solvent has the added advantage of permitting economical and efficient separation of oxygenated organic compounds from the reaction product obtained in the hydrogenation of carbon monoxide. Such solvent may be an aqueous or anhydrous glycol. While we prefer to use ethylene glycol as an overall generally suitable solvent, it should be noted that our invention is not limited solely to its use. Other glycol solvents may be successfully employed, such as diethylene glycol, isopropylene glycol, triethylene glycol, trimethylene glycol, and the like.

The bottoms obtained from distillation tower 56 comprise a mixture of alcohols having 7 or more carbon atoms per molecule and also comprise proportionately large quantities of the glycol treating agent. These are transferred through line 61 to a distillation tower 62. In tower 62 the mixture is heated to distill overhead alcohols present through line 63. The bottoms obtained from tower 62 comprising proportionately large quantities of the glycol treating agent are withdrawn through line 64, passed through line 65 into line 53 and are thus returned to the system for reuse.

The overheads from tower 62, comprising alcohols having 7 or more carbon atoms per molecule and small amounts of the glycol treating agent, are withdrawn through line 63 to a low point in an extraction tower 66. In tower 66 the alcohol stream introduced through line 63 is subjected to intimate countercurrent contact with water regulated to introduce sufficient quantities to remove the glycol treating agent from alcohols present. Water so used is transferred into tower 66 at an upper point through line 67. Following countercurrent contact in tower 66 between the alcohol stream containing the glycol treating agent and the introduced water, separation between an alcohol phase comprising alcohols having 7 or more carbon atoms per molecule and a water phase comprising chiefly water containing small quantities of the glycol treating agent and small quantities of alcohols having 7 or more carbon atoms per molecule is effected. The alcohol phase from tower 66 is taken overhead through line 68 from which alcohols having 7 or more carbon atoms per molecule are recovered for further use outside the scope of the present process.

The water phase from tower 66 containing small portions of the glycol treating agent and small portions of alcohols having 7 or more carbon atoms per molecule comprises the extract obtained as a result of subjecting the alcohol stream introduced into tower 66 through line 63 to countercurrent extraction with water. The extract thus produced is withdrawn from the bottom of tower 66 through the line 69 and is transferred to a distillation tower 70. In tower 70 the aqueous glycol-alcohol extract is heated to effect dehydration of the glycol solvent. As a result of distillation in tower 70 and overhead comprising an aqueous alcohol mixture containing alcohols having 7 or more carbon atoms per molecule is transferred through line 71. Bottoms comprising water-free glycol solvent are passed through line 72 into line 65. From line 65 the glycol solvent is transferred through line 53 with which line 65 connects and is thus employed as the treating agent in tower 52 as described above.

The overhead from tower 70 comprising an aqueous alcohol mixture containing alcohols having 7 or more carbon atoms per molecule is transferred through line 71 into a separator 73. In the latter the mixture is separated into an upper or alcohol phase and a lower or water phase. The alcohol phase from separator 73, comprising alcohols having 7 or more carbon atoms per molecule, is passed through line 74 into line 68 from which these alcohols are withdrawn for further use outside the scope of the present process. The water phase from separator 73 is withdrawn as bottoms through line 75 and transferred into line 67 for use in tower 66 as an extraction agent in the manner described above. Make-up water is supplied through line 76.

The overhead from tower 52 comprising hydrocarbons containing small quantities of absorbed glycol treating agent, as previously described, is transferred from tower 52 through line 55. The overhead from separator 58 comprising a hydrocarbon upper phase, as previously described, is transferred from separator 58 through line 59, which connects with line 55. The combined hydrocarbon-glycol mixture thus obtained is transferred through line 55 to a low point in an extraction tower 77. In tower 77 the mixture introduced through line 55 is subjected to intimate countercurrent contact with water as a treating agent which is introduced into tower 77 at an upper point through line 78. The water thus employed may conveniently be a portion of a water phase withdrawn as bottoms from separator 73 through line 75 as previously described. The hydrocarbon-glycol mixture and the water are contacted in tower 77 under conditions effective to absorb in the water substantially all of the glycol solvent present in the mixture passing through line 55. As a result of the extraction process in tower 77 and upper hydrocarbon or oil layer and a lower or aqueous glycol layer are produced. The oil layer from tower 77 is withdrawn as overheads through line 79 for further use outside the scope of this process. The extract from tower 77 comprising an aqueous glycol layer is withdrawn as bottoms through line 80 and transferred through line 81 to a low point in tower 70 for subsequent dehydration of the glycol treating agent in the manner previously described.

As described above, the aqueous phase withdrawn from the bottom of separator 14 through line 16 is combined with the scrubbing water containing dissolved oxygenated compounds withdrawn from the bottom of oil scrubber 21 through line 23. The stream of dissolved oxygenated compounds thus obtained in line 16 contains proportionately large quantities of light alcohols, light organic acids, and water; relatively smaller quantities of acids, aldehydes and ketones are also present. The combined stream comprising a mixture containing dissolved oxygenated compounds is tranferred through line 16 to a distillation tower 82. In tower 82 the mixture of oxygenated compounds is heated to distill overhead the lowest boiling components of the mixture which are acetaldehyde and propionaldehyde and which are transferred through line 83 for further use outside the scope of this process. The bottoms obtained from tower 82 comprise organic acids in aqueous solution. These acids are transferred through line 84 for further treatment to be hereinafter described.

An intermediate fraction from tower 82 comprising an acetaldehyde-free distillate is transferred as a sidestream from tower 82 through line 85. This distillate contains light alcohols having from 3 to 6 carbon atoms per molecule, aldehydes other than acetaldehyde and propionaldehyde and contains in addition ketones, esters, traces of organic acids and water. This distillate is next treated with alkali in order to effect neutralization of traces of organic acids present, to polymerize aldehydes and to saponify esters. For this purpose the distillate is transferred from tower 82 through line 85 to a caustic treater 86, in which it is intimately mixed with alkali in a suitable amount introduced through line 87. After the components of the mixture are maintained in intimate contact for a time sufficient to effect the desired neutralization of traces of organic acids present in the distillate from tower 82 and to effect polymerization of aldehydes and saponification of esters, the mixture is withdrawn from caustic treater 86 through line 88. The mixture from caustic treater 86 is transferred through line 88 to a separator 89. In separator 89 separation is effected between an upper phase comprising aldehyde polymers transferred through line 90 and a lower phase comprising a mixture of light alcohols having from 3 to 6 carbon atoms per molecule, ketones, small quantities of hydrocarbons and water which is transferred through line 91. The aldehyde polymers transferred through line 90 are withdrawn from further use outside the scope of this process.

The lower aqueous phase from separator 89 comprising an aqueous mixture of light alcohols having from 3 to 6 carbon atoms per molecule, ketones and small quantities of hydrocarbons is transferred through line 91 which is joined by line 32, previously referred to, containing the lower aqueous phase from settler 31 and comprising an aqueous mixture of salts of heavy organic acids, saponified esters, low boiling alcohols and aldehyde polymers. The combined stream is transferred through line 91 to a distillation tower 92. It should be noted that an alternative method of treating the lower aqueous phase transferred from settler 31 through line 32 may be achieved by transferring the stream so obtained through line 93 directly into caustic treater 86 for further treatment in the manner described above.

The combined stream transferred through line 91 into tower 92 comprises an aqueous mixture of salts of heavy organic acids, light alcohols having up to 6 carbon atoms per molecule, ketones, small quantities of hydrocarbons and excess alkali. In tower 92 the mixture is heated to distill a mixture of alcohols, ketones and hydrocarbons taken overhead with azeotropic water and is transferred through line 94. The bottoms from tower 92 comprise an aqueous mixture of salts of organic acids and excess alkali and are transferred through line 95 for further treatment in the process hereinafter described.

The overhead from tower 92 comprising a mixture of alcohols and ketones, may contain small quantities of hydrocarbons which must be removed in order to effect recovery of pure alcohols. It has been found that the hydrocarbons tend to concentrate as their homogeneous alcohol azeotropes in the distillation cuts taken between the various alcohols. We have found that in such aqueous alcohol solutions contaminating hydrocarbons can be removed efficiently and economically by means of one or more hydrocarbons which are themselves readily removable. In principle the process may be considered as one of dilution rather than extraction in that the undesirable hydrocarbons are replaced by one or more of the aforementioned hydrocarbons that may be readily eliminated and, therefore, the process has a particular application to the present process of separation of oxygenated compounds obtained from the reduction of carbon monoxide with hydrogen employing a powdered iron, nickel, or cobalt catalyst.

We have found that such a hydrocarbon may be normal pentane which is highly suitable in over-all use as applied to the aforementioned process as evidenced by experimental laboratory data. It should be noted that the operation is not restricted to the sole use of pentane for the purpose indicated, but that other lighter or heavier hydrocarbons may also be successfully employed such as butane or heptane. Butane has the advantage of not being known to form an azeotrope with methanol, although it has a higher solubility in aqueous alcohol solutions. On the other hand, it may be desirable to use heavier hydrocarbons as a solvent such as hexane, the latter being less soluble than pentane but requiring the stripping of lighter hydrocarbons out of the hexane as well as the stripping of the hexane from the heavier hydrocarbons. The choice of a suitable hydrocarbon will be influenced by its solubility, and by its boiling point or the boiling points of its azeotropes with light alcohols.

To effect removal of such contaminating hydrocarbons, the overhead from tower 92, comprising an alcohol-ketone mixture containing small quantities of hydrocarbons, is transferred through line 94 to an upper point in an extraction tower 96. The upper phase from settler 50 obtained in the manner previously described and containing alcohols having 5 or 6 carbon atoms per molecule and small quantities of hydrocarbons, and transferred from settler 50 through line 51, may be combined at this point by transferring the mixture through line 51 to combine with the mixture in line 94. The combined mixture is transferred to an upper point in tower 96. In tower 96 the mixture introduced through line 94 is subjected to intimate countercurrent contact with pentane or other selected suitable hydrocarbon treating agent which is introduced into tower 96 at a low point through line 97. The treating agent and the alcohol-ketone mixture containing hydrocarbons are contacted in tower 96 under conditions effective to absorb in the treating agent, the hydrocarbons present in the mixture. The extract thus produced, comprising a mixture of alcohols having 3 to 6 carbon atoms per molecule and the pentane treating agent, is withdrawn from the bottom of tower 96 through line 98 for further treatment to be hereinafter described. The overhead from tower 96 comprising the pentane treating agent and higher hydrocarbons together with small quantities of alcohols is transferred from tower 96 through line 99 to a distillation tower 100. In tower 100 the mixture is heated to distill overhead the pentane treating agent and small quantities of alcohols present as pentane-alcohol azeotropes which are withdrawn through line 101. The bottoms from tower 100 comprise the higher hydrocarbons which have been removed from the alcohol-ketone mixture previously transferred through line 94 into tower 96. The bottoms thus obtained are transferred through line 102 to combine with the upper oil phase withdrawn from settler 31 through line 33 as previously described.

The overheads from tower 100 comprising pentane-alcohol azeotropes are transferred through line 101 into a mixer 103 which is provided to intimately mix a relatively small amount of water with the alcohol-pentane mixture. Water thus employed is introduced through line 104. The resulting mixture is then transferred through line 105 to a separator 106. In separator 106, by means of settling action, an upper phase comprising pentane is withdrawn through line 97, entering tower 96 for further use of the pentane treating agent. Make-up pentane is introduced through line 107.

The bottoms from separator 106 comprising an aqueous alcohol stream containing small quantities of pentane are transferred through line 108 to combine with the extract from tower 96 comprising a mixture of alcohols having 3 to 6 carbon atoms per molecule and also containing small quantities of pentane as previously described. The combined mixture is transferred through line 98 into a distillation tower 109 to effect removal of the pentane treating agent from the alcohol stream. In tower 109 the mixture is heated to distill overhead pentane-methanol azeotropes through line 110 and a pentane-free raffinate withdrawn as bottoms through line 111.

It is also possible to introduce the pentane treating agent at a low point in tower 39 and also at a low point in tower 52, to effect hydrocarbon extraction in these towers. One advantage in following such a procedure, lies in the elimination of extraction tower 96, the alcohol stream in line 51 being transferred directly into tower 100 for further treatment in the process described above.

The overhead distillate from tower 109 comprising pentane-methanol azeotropes is transferred through line 110 into line 101 to combine with the overhead distillate from tower 100, which also comprises pentane-light alcohol azeotropes. The combined stream is transferred through line 101 into mixer 103 where it is water-washed for subsequent processing in the manner previously described, in order to effect subsequent recovery of methanol. The pentane-free raffinate withdrawn as bottoms from tower 109 through line 111 will comprise in addition, acetone, methyl ethyl ketone, higher ketones and water. These are transferred through line 111 into a conventional series of alcohol and ketone fractionation steps where, in the manner known to those skilled in the art, an ultimate recovery of ketones and alcohols may be effected. Where higher molecular weight ketones are present, they may be converted to alcohols by reduction with hydrogenation, or they may be removed from higher alcohols present by extraction with a suitable solvent such as aqueous sodium bisulfite solution.

In order to avoid forming the acetone-methanol azeotrope, methanol is recovered by distillation at approximately 350 pounds per square inch absolute. Acetone is removed by the usual method of simple fractionation, and by similar means ethanol is obtained as its azeotrope with water and then recovered by ordinary separation processes to effect separation of non-aqueous ethanol. Where methyl ethyl ketone is present and its removal from ethanol is desired, separation can be effected by distillation at about 60 pounds per square inch absolute, ethanol being taken overhead. The remaining alcohol stream comprising aqueous solutions of alcohols having from 3 to 6 carbon atoms per molecule may be withdrawn for further use or treatment outside the scope of this process.

However, where dehydration of the remaining alcohol stream is desired, such dehydration may be effected through the propanol-water azeotrope. Accordingly, following methanol, ethanol, acetone and methyl ethyl ketone fractionation steps as indicated above, the alcohol stream is transferred to a fractionation tower 113. Tower 113 is heated to distill overhead a propanol-water azeotrope which is withdrawn through line 114 and transferred through line 115, with which line 114 connects, into a distillation tower 116. Tower 116 is provided to effect the dehydration of propanol, the latter is therefore heated under conditions effective to obtain water-free propanol as bottoms which are withdrawn through line 117 for further use outside the scope of this process. A portion of the water-free propanol thus obtained may be transferred through line 118 into line 112, which enters tower 113, for reuse of the propanol in effecting subsequent dehydration of additional quantities of alcohols entering tower 113, in the process described above.

The overhead from tower 116 comprises water containing propanol and hydrocarbons. These are withdrawn through line 119 and transferred to a settler 120. In settler 120 the mixture is separated into an upper phase, comprising a propanol-hydrocarbon-water layer, rich in hydrocarbons, which is withdrawn through line 121 and a lower phase, comprising a propanol-hydrocarbon water layer, rich in water, which is withdrawn through line 122. The upper phase from settler 120 withdrawn through line 121 is transferred into line 115 entering tower 116 for reuse of the propanol in the process described above. The lower phase from settler 120 withdrawn through line 122 is transferred to a distillation tower 123. Tower 123 is heated to distill overhead a water-free propanol-hydrocarbon mixture which is withdrawn through line 124, and bottoms comprising excess water which are withdrawn through line 125. The overhead from tower 123, comprising a water-free propanol-hydrocarbon mixture withdrawn through line 124, is transferred to line 115 to combine with the upper phase from settler 120, withdrawn through line 121 and entering line 115. The combined propanol-hydrocarbon-water stream is then returned to tower 116 through line 115 for further use in the process described above.

As a result of the process hereinbefore described, the bottoms from tower 92 withdrawn through line 95, comprise an aqueous mixture of salts of organic acids and excess alkali. In accordance with the process of the invention, the mixture is subjected to further treatment in order to release organic acids present in the mixture from their salts. The aqueous mixture of organic acids and excess alkali is, therefore, transferred through line 95 to a mixer 126. A high-boiling inorganic acid having a boiling point higher than that of water, such as sulfuric acid, or an inorganic acid which forms a maximum boiling azeotrope with water, such as hydrochloric acid, is introduced through line 127 and combined with the aqueous mixture of organic acids and excess alkali in line 95 entering mixer 126. Mixer 126 is provided to intimately mix the aqueous alkaline mixture of salts of organic acids with the introduced inorganic acid in order to effect neutralization of these salts. The resulting mixture from mixer 126 comprises free organic acids and salts of the introduced inorganic acid which are withdrawn through line 128. The aqueous mixture of free organic acids and inorganic salts is transferred through line 128 to a separator 129. In separator 129 the heavier organic acids will separate from the water solution by reason of their insolubility and will contain a portion of the lighter water-soluble organic acids by reason of the solvent action of the heavier acids on the lighter acids. These acids, comprising an upper acid-rich phase in separator 129 are withdrawn overhead through line 130. The lower water-rich phase in separator 129 comprising inorganic salts, the introduced inorganic acid and some of the lighter organic acids are withdrawn as bottoms through line 131 and transferred to a distillation tower 132. Tower 132 is heated under conditions effective to distill overhead organic acids as their azeotropes having 3 or more carbon atoms per molecule. The latter are withdrawn from tower 132 through line 133 and are thus transferred to line 130 to combine with the acids withdrawn as an upper phase from separator 129 through line 130. The combined stream is transferred through line 130 to combine with the aqueous solution of organic acids obtained as bottoms from tower 82 through line 84 as hereinbefore described. The bottoms from tower 132 comprising inorganic salts, excess quantities of the introduced inorganic acid and excess water, are withdrawn through line 134 for further use outside the scope of this process.

In order to obtain recovery of water-free organic acids, the total stream of aqueous organic acids in line 84 is next transferred, in accordance with the process of the invention, to an extraction tower 135. In tower 135 the stream introduced through line 184 is subjected to intimate counter-current contact with a solvent treating agent, such as ethyl acetate, which is introduced into tower 135 through line 136. The treating agent and the aqueous stream of organic acids are contacted in tower 135 under conditions effective to absorb in the treating agent a large proportion of the water contained in the aqueous stream of organic acids passing through line 84. The extract thus produced comprises an acid-rich mixture containing organic acids, excess solvent treating agent, and proportionately small quantities of water and is withdrawn overhead from tower 135 through line 137. The bottoms from tower 135, comprising a raffinate containing the solvent treating agent and proportionately large quantities of water, are withdrawn from tower 135 through line 138.

The extract from tower 135 comprising an acid-rich mixture containing organic acids, excess solvent treating agent and proportionately small quantities of water, is withdrawn overhead through line 137 and transferred to a distillation tower 139. Tower 139 is heated under conditions effective to distill overhead a mixture of the solvent treating agent and water which is withdrawn through line 140. Bottoms comprising both anhydrous light and heavy organic acids, solvent-free, are withdrawn from tower 139 through line 141. The latter may be transferred through line 141 into a conventional series of organic acid fractionation steps, where in the manner known to those skilled in the art, an ultimate recovery of individual organic acids having at least 2 carbon atoms per molecule may be effected. The overhead from tower 139, comprising a mixture of the solvent treating agent and water, is transferred through line 140 to the top of a separator 142. In separator 142 separation is effected between an upper layer, comprising the solvent treating agent and a lower water-layer, which is withdrawn as bottoms from separator 142 through line 143. The upper layer from separator 142 comprising the solvent treating agent is withdrawn through line 136 for further use in tower 135, as described above. Make-up solvent is introduced through line 144.

The bottoms from tower 135 comprising a raffinate containing the solvent treating agent and proportionately large quantities of water, are withdrawn through line 138 and transferred to a distillation tower 145. The bottoms obtained from separator 142 comprising a lower water-layer, withdrawn from separator 142 through line 143, are transferred into line 138 with which line 143 connects and are thus combined with the bottoms from tower 135 to be transferred to tower 145. Tower 145 is heated under conditions effective to distill overhead water azeotropes of the solvent treating agent which are withdrawn through line 146. Bottoms, comprising excess water are withdrawn from tower 145 through line 147. The water azeotropes of the solvent treating agent which are withdrawn overhead from tower 145 through line 146 are transferred into line 140 with which line 146 connects. In line 140 the overheads from tower 146 are combined with the overheads from tower 139 which comprise a mixture of the solvent treating agent and water. The combined mixture is then transferred through line 140 to the top of separator 142 for further processing as hereinbefore described.

It should be noted that while we prefer to use ethyl acetate as a solvent in the aforementioned acid extraction step, our invention is not limited solely to its use; other solvents may be advantageously employed, such as ethyl ether, isopropyl ether, isopropyl chloride and the like. Ethyl ether may have particular desirability in instances where cross-esterification and hydrolysis are encountered when ethyl acetate is used as a solvent. Where such is the case and ethyl ether is used as a solvent, an appreciably larger volume of solvent would be required. In order to obtain an anhydrous stream where ethyl ether is used, the ether-water azeotrope can best be removed at a pressure of approximately 100 pounds per square inch absolute. In addition to using solvents lower boiling than the acids to be extracted, it is also possible to use high boiling alcohols, ketones, and organic acids in the process described above.

To recapitulate, our invention is directed to a process for the separation of oxygenated organic compounds present in the reactor gas obtained from the hydrogenation of carbon monoxide in the presence of a catalyst, where such compounds may include light and heavy alcohols and organic acids, esters, aldehydes, ketones and hydrocarbons. However, while the invention has a particular applicability to the separation of such compounds from the source indicated, the process of the invention is not necessarily restricted to effecting the desired separation of these compounds as derived from the aforementioned source. The process of the invention may be also successfully applied to the separation of any mixtures of the aforementioned compounds, without regard to the source from which these mixtures may have been derived and without regard to the composition of such mixtures.

In addition, while we have described a particular embodiment of our invention for purposes of illustration, it should be understood that various modifications and adaptations thereof, which will be obvious to one skilled in the art, may be made within the spirit of the invention as set forth in the appended claims.

We claim:

1. A process for recovering organic acids and alcohols contained in an oil product liquid phase obtained from the condensation of the reaction product produced in the catalytic hydrogenation of carbon monoxide, which comprises: fractionating at least a portion of said oil product liquid phase to produce a relatively low boiling fraction boiling below about 200° F., a relatively high boiling fraction boiling above about 430° F. and an intermediate boiling fraction comprising hydrocarbons, organic acids and alcohols; subjecting said intermediate boiling fraction to extraction with a solvent comprising a light alcohol to produce an extract phase comprising organic acids and alcohols and a raffinate phase comprising hydrocarbons; and separating the phases thus produced.

2. A process for recovering organic acids and alcohols contained in an oil product liquid phase obtained from the condensation of the reaction product produced in the catalytic hydrogenation of carbon monoxide, which comprises: fractionating at least a portion of said oil product liquid phase to produce a relatively low boiling fraction boiling below about 200° F., a relatively high boiling fraction boiling above about 430° F. and an intermediate boiling fraction comprising hydrocarbons, organic acids and alcohols; subjecting said intermediate boiling fraction to extraction with a solvent comprising a light alcohol to produce an extract phase comprising organic acids, alcohols and containing hydrocarbons in minor proportion and a raffinate phase comprising hydrocarbons; separating said phases; subjecting said extract phase to solvent extraction with a relatively low boiling hydrocarbon to produce an extract phase comprising hydrocarbons and a raffinate phase comprising organic acids and alcohols; and separating the phases thus produced.

3. A process for recovering organic acids and alcohols contained in an oil product liquid phase obtained from the condensation of the reaction product produced in the catalytic hydrogenation of carbon monoxide, which comprises: fractionating at least a portion of said oil product liquid phase to produce a relatively low boiling fraction boiling below about 200° F., a relatively high boiling fraction boiling above about 430° F., an intermediate first fraction boiling between about 200° F. and about 310° F. and an intermediate second fraction boiling between about 310° F. and about 430° F., each of said intermediate boiling fractions comprising organic acids, alcohols and hydrocarbons; separately subjecting said intermediate boiling first fraction to extraction with a solvent comprising a light alcohol and separately subjecting said intermediate boiling second fraction to extraction with a solvent comprising a light alcohol whose boiling point is higher than that of said first-mentioned solvent to form respective extract phases comprising organic acids and alcohols and respective raffinate phases comprising hydrocarbons; and separating extract phases from raffinate phases thus produced.

4. A process for recovering organic acids and alcohols contained in an oil product liquid phase obtained from the condensation of the reaction product produced in the catalytic hydrogenation of carbon monoxide, which comprises: fractionating at least a portion of said oil product liquid phase to produce a relatively low boiling fraction boiling below about 200° F., a relatively high boiling fraction boiling above about 430° F., an intermediate first fraction boiling between about 200° F. and about 310° F. and an intermediate second fraction boiling between about 310° F. and about 430° F., each of said intermediate boiling fractions comprising organic acids, alcohols and hydrocarbons; separately subjecting said intermediate boiling first fraction to extraction with a solvent comprising a light alcohol and separately subjecting said intermediate boiling second fraction to extraction with a solvent comprising a light alcohol whose boiling point is higher than that of said first-mentioned solvent to form respective extract phases comprising organic acids, alcohols and containing hydrocarbons in minor proportion and respective raffinate phases comprising hydrocarbons; separating said extract phases from said raffinate phases; subjecting the extract obtained from extraction treatment of said intermediate boiling first fraction to solvent extraction with a relatively low boiling hydrocarbon to produce an extract phase comprising hydrocarbons and a raffinate phase comprising organic acids and alcohols; and separating the phases thus produced.

5. A process for recovering organic acids and alcohols contained in an oil product liquid phase obtained from the condensation of the reaction product produced in the catalytic hydrogenation of carbon monoxide, which comprises: neutralizing at least a portion of said oil product liquid phase to obtain a mixture comprising hydrocarbons, alcohols and alkali salts of organic acids; separating alkali salts from said neutralized mixture; fractionating at least a portion of said neutralized material to produce a relatively low boiling fraction boiling below about 200° F., a relatively high boiling fraction boiling above about 430° F. and an intermediate boiling fraction comprising hydrocarbons and alcohols; subjecting said intermediate boiling fraction to extraction with a solvent comprising a light alcohol to produce an extract phase comprising alcohols and a raffinate phase comprising hydrocarbons; and separating the phases thus produced.

6. A process for recovering organic acids and alcohols contained in an oil product liquid phase obtained from the condensation of the reaction product produced in the catalytic hydrogenation of carbon monoxide, which comprises: neutralizing at least a portion of said oil product liquid phase to obtain a mixture comprising hydrocarbons, alcohols and alkali salts of organic acids; separating alkali salts from said neutralized mixture; fractionating at least a portion of said neutralized mixture to produce a relatively low boiling fraction boiling below about 200° F., a relatively high boiling fraction boiling above about 430° F., and an intermediate boiling fraction comprising hydrocarbons and alcohols; subjecting said intermediate boiling fraction to extraction with a solvent comprising a light alcohol to produce an extract phase comprising alcohols and containing hydrocarbons in minor proportion and a raffinate phase comprising hydrocarbons; separating said phases; subjecting said extract phase to solvent extraction with a relatively low boiling hydrocarbon to produce an extract phase comprising hydrocarbons and a raffinate phase comprising alcohols; and separating the phases thus produced.

7. A process for recovering organic acids and alcohols contained in an oil product liquid phase obtained from the condensation of the reaction product produced in the catalytic hydrogenation of carbon monoxide, which comprises: neutralizing at least a portion of said oil product liquid phase to obtain a mixture comprising hydrocarbons, alcohols and alkali salts of organic acids; separating alkali salts from said neutralized mixture; fractionating at least a portion of said neutralized mixture to produce a relatively low boiling fraction boiling below about 200° F., a relatively high boiling fraction boiling above about 430° F., an intermediate first fraction boiling between about 200° F. and about 310° F. and an intermediate second fraction boiling between about 310° F. and about 430° F., each of said intermediate boiling fractions comprising alcohols and hydrocarbons; separately subjecting said intermediate boiling first fraction to extraction with a solvent comprising a light alcohol and separately subjecting said intermediate boiling second fraction to extraction with a solvent comprising a light alcohol whose boiling point is higher than that of said first-mentioned solvent to form respective extract phases comprising alcohols and respective raffinate phases comprising hydrocarbons; and separating extract phases from raffinate phases thus produced.

8. A process for recovering organic acids and alcohols contained in an oil product liquid phase obtained from the condensation of the reaction product produced in the catalytic hydrogenation of carbon monoxide, which comprises: neutralizing at least a portion of said oil product liquid phase to obtain a mixture comprising hydrocarbons, alcohols and alkali salts of organic acids; separating alkali salts from said neutralized mixture; fractionating at least a portion of said neutralized mixture to produce a relatively low boiling fraction boiling below about 200° F., a relatively high boiling fraction boiling above about 430° F., an intermediate first fraction boiling between about 200° F. and about 310° F., and an intermediate second fraction boiling between about 310° F. and about 430° F., each of said intermediate boiling fractions comprising alcohols and hydrocarbons; separately subjecting said intermediate first fraction to extraction with a solvent comprising a light alcohol and separately subjecting said intermediate boiling second fraction to extraction with a solvent comprising a light alcohol whose boiling point is higher than that of said first-mentioned solvent to form respective extract phases comprising alcohols and containing hydrocarbons in minor proportion and respective raffinate phases comprising hydrocarbons; separating said phases; subjecting the extract obtained from extraction treatment of said intermediate boiling first fraction to solvent extraction with a relatively low boiling hydrocarbon to produce an extract phase comprising hydrocarbons and a raffinate phase comprising alcohols; and separating the phases thus produced.

9. A process for recovering organic acids and alcohols contained in an oil product liquid phase obtained from the condensation of the reaction product produced in the catalytic hydrogenation of carbon monoxide, which comprises: water-washing at least a portion of said oil product liquid phase to dissolve water-soluble components contained therein; separating water-soluble components from said water-washed oil product; fractionating at least a portion of said water-washed oil product to produce a relatively low boiling fraction boiling below about 200° F., a relatively high boiling fraction boiling above about 430° F. and an intermediate boiling fraction comprising hydrocarbons, organic acids and alcohols; subjecting said intermediate boiling fraction to extraction with an aqueous solution of a solvent comprising a light alcohol to produce an extract phase comprising organic acids, alcohols and water and a raffinate phase comprising hydrocarbons; separating the phases thus produced; separating solvent from said extract phase; separating the remainder of said extract phase into an oil soluble layer comprising organic acids and alcohols and an aqueous layer comprising water-soluble components; and recycling said aqueous layer to said water-washing step.

10. A process for recovering organic acids and alcohols contained in an oil product liquid phase obtained from the condensation of the reaction product produced in the catalytic hydrogenation of carbon monoxide, which comprises: neutralizing at least a portion of said oil product liquid phase to obtain a mixture comprising hydrocarbons, alcohols and alkali salts of organic acids; water-washing said neutralized mixture to dissolve alkali salts contained therein; separating alkali salts from said water-washed mixture; fractionating at least a portion of the remainder of said water-washed material to produce a relatively low boiling fraction boiling below about 200° F., a relatively high boiling fraction below about 430° F. and an intermediate boiling fraction comprising hydrocarbons and alcohols; subjecting said intermediate boiling fraction to extraction with an aqueous solution of a solvent comprising a light alcohol to produce an extract phase comprising alcohols and water and a raffinate phase comprising hydrocarbons; separating the phases thus produced; separating solvent from said extract phase; separating the remainder of said extract phase into an oil-soluble layer comprising alcohols and an aqueous layer comprising water-soluble components; and recycling said aqueous layer to said water-washing step.

11. A process for recovering organic acids and alcohols contained in an oil product liquid phase obtained from the condensation of the reaction product produced in the catalytic hydrogenation of carbon monoxide, which comprises: fractionating at least a portion of said oil product liquid phase to produce a relatively low boiling fraction boiling below about 200° F., a relatively high boiling fraction boiling above about 430° F. and an intermediate boiling fraction comprising hydrocarbons, organic acids and alcohols; subjecting said intermediate boiling fraction to extraction with a solvent comprising a light alcohol to produce an extract phase comprising organic acids, alcohols and containing hydrocarbons in minor proportion and a raffinate phase comprising hydrocarbons; separating said phases; subjecting said extract phase to solvent extraction with a relatively low boiling hydrocarbon to produce an extract phase comprising said relatively low boiling hydrocarbon solvent and higher hydrocarbons and a raffinate phase comprising organic acids and alcohols; separating the phases thus produced; separating said relatively low boiling hydrocarbon solvent from higher boiling hydrocarbons in said last-mentioned extract phase; and recycling higher boiling hydrocarbons thus separated to said fractionation step.

12. The process of claim 2 wherein the solvent is methanol.

13. The process of claim 2 wherein the solvent is ethanol.

14. The process of claim 2 wherein the solvent is propanol.

15. The process of claim 2 wherein the solvent is a glycol.

16. The process of claim 2 wherein the solvent is ethylene glycol.

17. A process for recovering organic acids and alcohols contained in an oil product liquid phase obtained from the condensation of the reaction product produced in the catalytic hydrogenation of carbon monoxide, which comprises; neutralizing at least a portion of said oil product liquid phase to obtain a mixture comprising hydrocarbons, alcohols and alkali salts of organic acids; separating alkali salts from said neutralized mixture; fractionating at least a portion of said neutralized mixture to produce a relatively low boiling fraction boiling below about 200° F., a relatively high boiling fraction boiling above about 430° F., an intermediate first fraction boiling between about 200° F. and about 310° F., and an intermediate second fraction boiling between about 310° F. and about 430° F., each of said intermediate boiling fractions comprising alcohols and hydrocarbons; separately subjecting said intermediate first fraction to extraction with methanol and separately subjecting said intermediate boiling second fraction to extraction with ethylene glycol to form respective extract phases comprising alcohols and containing hydrocarbons in minor proportion and respective raffinate phases comprising hydrocarbons; separating said phases; subjecting the extract obtained from extraction treatment of said intermediate boiling first fraction to solvent extraction with a relatively low boiling hydrocarbon to produce an extract phase comprising hydrocarbons and a raffinate phase comprising alcohols; and separating the phases thus produced.

18. A process for recovering organic acids and alcohols contained in an oil product liquid phase obtained from the condensation of the reaction product produced in the catalytic hydrogenation of carbon monoxide, which comprises: fractionating at least a portion of said oil product liquid phase to produce a relatively low boiling fraction boiling below about 200° F., a relatively high boiling fraction boiling above about 430° F. and an intermediate boiling fraction comprising hydrocarbons, organic acids and alcohols; subjecting said intermediate boiling fraction to extraction with methanol to produce an extract phase comprising organic acids, alcohols and containing hydrocarbons in minor proportion and a raffinate phase comprising hydrocarbons; separating said phases; subjecting said extract phase to solvent extraction with a relatively low boiling hydrocarbon to produce an extract phase comprising said relatively low boiling hydrocarbon solvent and higher hydrocarbons and a raffinate phase comprising organic acids and alcohols; separating the phases thus produced; separating said relatively low boiling hydrocarbon solvent from higher boiling hydrocarbons in said last-mentioned extract phase; and recycling higher boiling hydrocarbons thus separated to said fractionation step.

HENRY G. McGRATH.
HERBERT J. PASSINO.
LOUIS C. RUBIN.

REFERENCES CITED

The following references are of record in the file of this patent:

UNITED STATES PATENTS

| Number | Name | Date |
| --- | --- | --- |
| 1,870,816 | Lewis | Aug. 9, 1932 |
| 2,002,533 | Frolich et al. | May 28, 1935 |
| 2,083,125 | Scheuble | June 8, 1937 |
| 2,186,249 | Lazar et al. | Jan. 9, 1940 |

FOREIGN PATENTS

| Number | Country | Date |
| --- | --- | --- |
| 250,563 | Great Britain | Aug. 27, 1927 |
| 350,502 | Great Britain | June 15, 1931 |

OTHER REFERENCES

Koch et al.: Brennstoff. chem. 16, 382 to 387 (1935).

Ferris et al.: Ind. & Eng. Chem., 23, 753 to 761.